Sept. 27, 1955   G. C. DE CROES ET AL   2,719,169
METHOD OF REFINING CRUDE ACRYLONITRILE
Filed June 30, 1951   2 Sheets-Sheet 1

George C. DeCroes
George A. Akin
INVENTORS

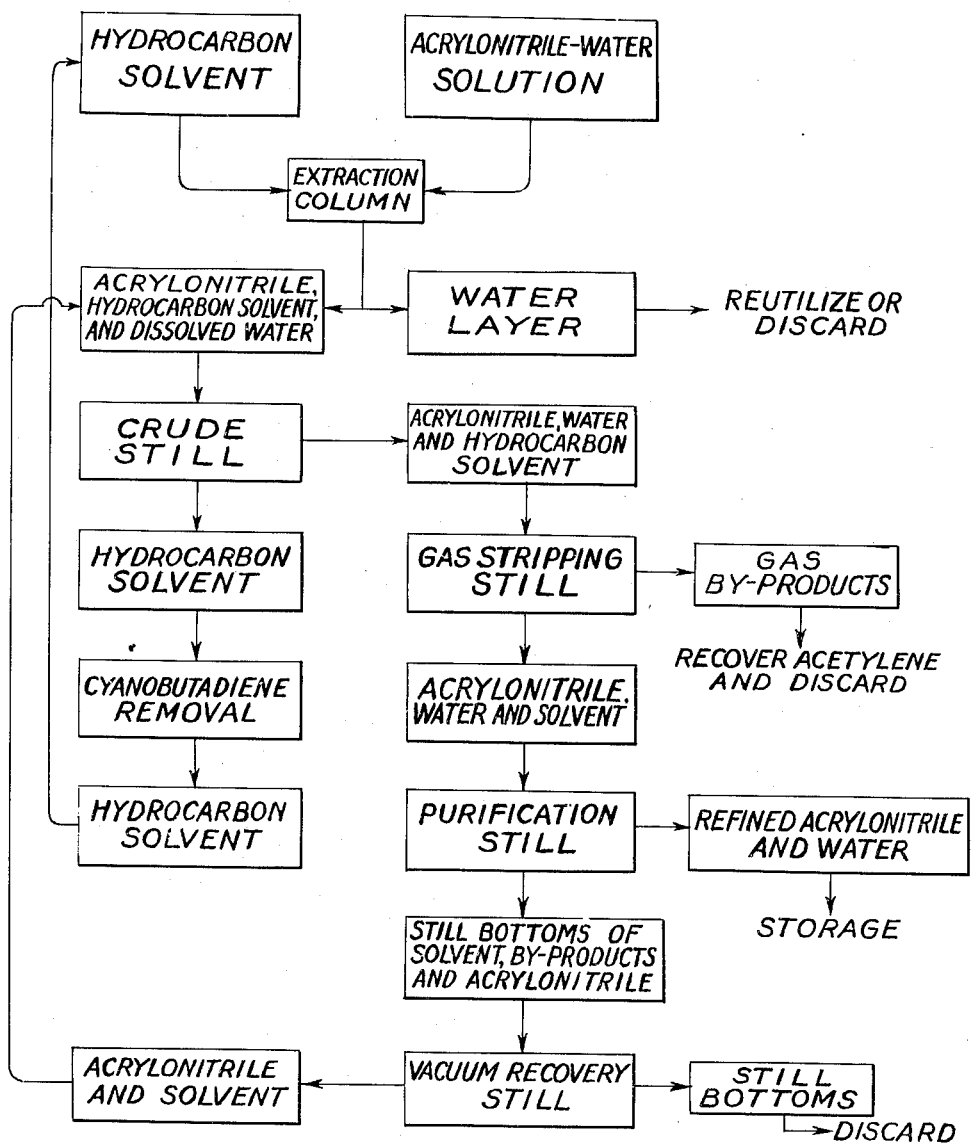

United States Patent Office 2,719,169
Patented Sept. 27, 1955

2,719,169

METHOD OF REFINING CRUDE ACRYLONITRILE

George C. De Croes and George A. Akin, Kingsport, Tenn., assignors to Eastman Kodak Company, Rochester, N. Y., a corporation of New Jersey Application June 30, 1951, Serial No. 234,534

12 Claims. (Cl. 260—465.3)

This invention relates to the refining of crude acrylonitrile, particularly from the dilute aqueous solution resulting from the absorption with water of acrylonitrile vapors produced by the reaction of acetylene and hydrocyanic acid in the presence of a Nieuwland type catalyst.

The acrylonitrile obtained from the reaction of hydrocyanic acid and acetylene in the presence of an aqueous acrylonitrile-forming catalyst solution (Nieuwland catalyst) is contaminated with impurities which must be removed from the acrylonitrile to obtain a product of sufficient purity for polymerization purposes. Further, some of the impurities present greatly affect the purification procedures involved, in that they bring about excessive polymerization of the acrylonitrile during such operations as distillation. The organic impurities present in the crude acrylonitrile include unreacted feed materials (acetylene and hydrocyanic acid), acetylene polymers (vinyl acetylene, divinyl acetylene, 1-ethynyl-butadiene-1,3, and higher polymers), acetaldehyde, lactonitrile, chloroprene, and cyano-butadiene. Most prior art processes include as the first step in recovery of crude acrylonitrile the condensation of acrylonitrile together with some condensable impurities or the absorption of the acrylonitrile and soluble impurities directly into water to form a 1 to 2 percent solution of acrylonitrile. The purification procedures then call for treatment of the crude acrylonitrile by distillation or other operations for purification. Our improved continuous method for refining acrylonitrile is particularly adapted to the treatment of dilute aqueous solutions of crude acrylonitrile to produce a refined acrylonitrile.

We have discovered that in the distillation of aqueous solutions of crude acrylonitrile where an azeotrope of acrylonitrile is separated as a distillate at head temperatures of 75° to 78° C., for example, and water is separated as still bottoms at 100° to 110° C., such impurities as cyanobutadiene tend to concentrate in the distillation column, particularly when the distillation is carried out in a continuous manner. 1-cyanobutadiene-1,3 and 2-cyanobutadiene-1,3 boil at about 140° C., but evidently form an azeotrope boiling above that of acrylonitrile-water azeotrope and below that of water. Even so, in the operation of the crude stills as above, some cyanobutadiene separates in the distillate. The concentration of such impurities as cyanobutadiene in the distillation column appears to promote the polymerization of the acrylonitrile in the column. In fact, in commercial operations crude stills of this type require frequent dismantling and cleaning.

In another type of recovery system, the acrylonitrile-containing gases from the catalyst chamber are condensed at a minimum temperature of about −60° C. The condensate is collected at a temperature of about 0° C. or higher and forms two layers. The lower or water layer is returned to the catalyst chamber, while the upper or organic layer is purified. In the distillation of the upper layer, undesirable polymerization of the acrylonitrile takes place.

We have found that polymer formation during purification can be greatly decreased by separating from the acrylonitrile at an early step in its purification treatment the substance which promotes polymerization of the acrylonitrile in the purification apparatus, and we accomplish this by extracting the acrylonitrile and impurities from the weak aqueous solution with a solvent having certain characteristics, after which the acrylonitrile is separated from the main body of the solvent in such manner as to leave with the solvent the particular substance, namely cyanobutadiene, which promotes polymerization. For the driest product, it is preferable to follow the solvent extraction step with distillation from the solvent and acrylonitrile of an azeotrope of acrylonitrile and whatever water was taken up by the solvent in the solvent extraction step, after which the solvent containing the remaining acrylonitrile is distilled so as to distill off acrylonitrile and leave the cyanobutadiene with the solvent. Our invention also includes novel and highly effective treatments for solvent to purify it for recycling to the extraction step, and we have also devised new purification procedures for treating the acrylonitrile resulting from the various distilling operations, these purification procedures providing a final product of such purity that it can be used for polymerization purposes.

The novel solvent purification procedures referred to include the scrubbing of the solvent, after removal of acrylonitrile, with sodium bisulfite, with sulfuric acid, or with a dieneophile such as maleic anhydride.

In the final purification of acrylonitrile, we have found phosphoric acid or a dieneophile such as maleic anhydride to be highly effective and to have novelty in this particular use.

A further novel aspect of our process is the use of methylene blue, dropped into the distillation columns, to inhibit polymerization in the columns.

It is a primary object of our invention to provide a method for refining crude acrylonitrile, which method may be operated as a continuous process, to produce a product of high purity.

A further object of the invention is to provide a purification process for crude acrylonitrile wherein polymerization of the acrylonitrile during the purification procedure is maintained at a minimum, thereby permitting continuous operation without the previous frequent dismantling of equipment for cleaning.

Another object of the invention resides in the early separation during the refining process of the polymerization causing impurity, cyanobutadiene, from the acrylonitrile solution to be refined, and this concept applies broadly to the purification of any polymerizable organic substance from a solution which contains an impurity having an accelerating effect on the polymerization of the substance during purification operations if not removed.

Another object of the invention is to provide a method of purifying solvent used in the solvent extraction of acrylonitrile, this method including scrubbing of the solvent with sodium bisulfite, sulfuric acid, or a dieneophile such as maleic anhydride to remove cyanobutadiene which would otherwise accumulate in the solvent.

Still another object of the invention is to provide a method of purifying acrylonitrile including treatment with phosphoric acid or a dieneophile such as maleic anhydride to remove acetylene polymers.

A further object of the invention resides in the dropping of methylene blue into stills used in purification of acrylonitrile so as to inhibit undesired polymerization in the stills.

These and other objects of the invention will become more apparent from a study of the following specification when read with the accompanying drawings, in which:

Figure 2 is a diagrammatic flow sheet of a preferred method of carrying out the invention to obtain a refined acrylonitrile containing a small amount of dissolved water.

Figure 1:
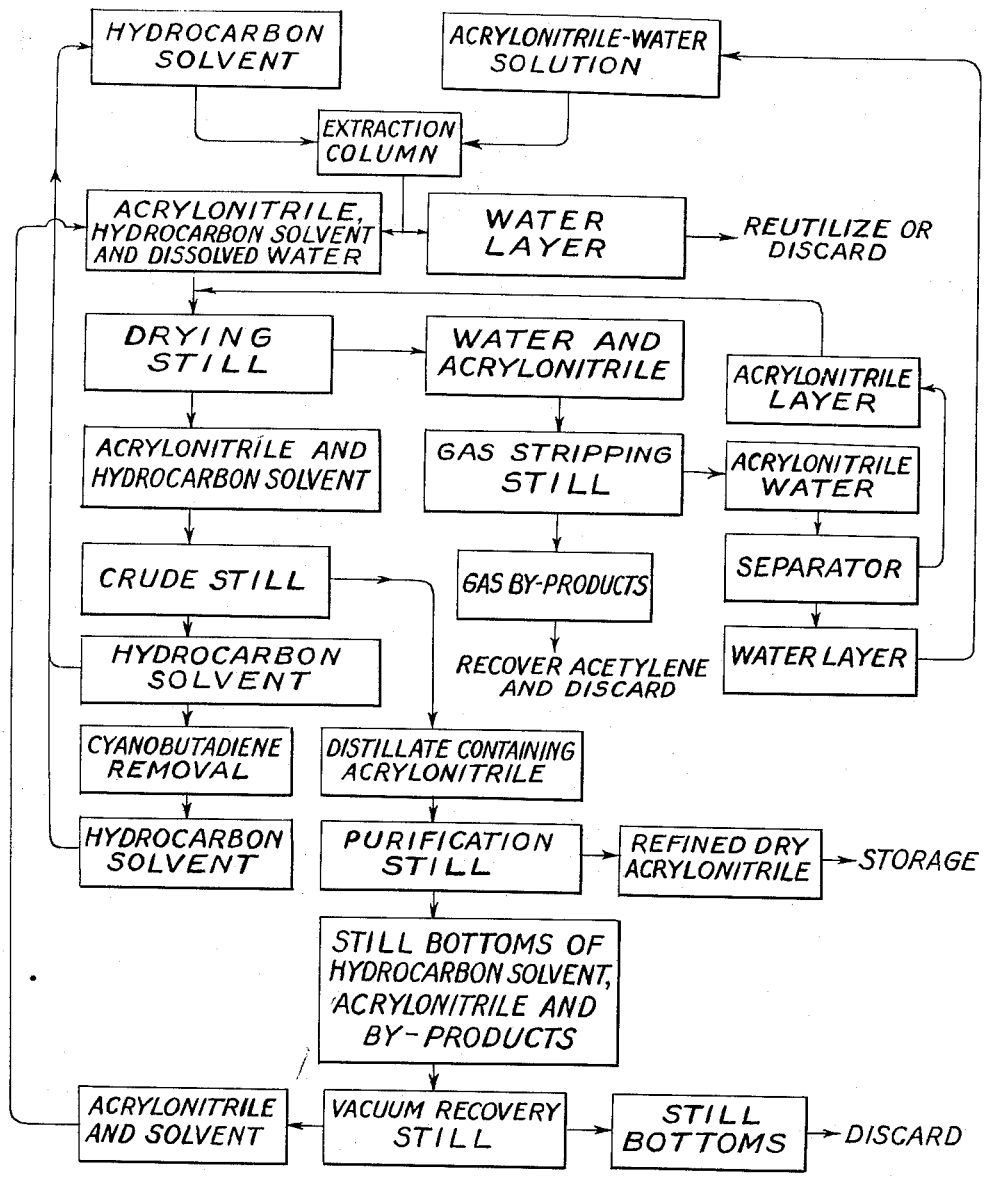
Figure 1 is a diagrammatic flow sheet of a preferred method of carrying out the invention to obtain dry refined acrylonitrile.

As shown in Figure 1, a quantity of dilute aqueous solution of acrylonitrile is extracted with an organic solvent, preferably xylene or ethyl benzene in an extraction column. Generally, the amount of solvent required is about one-third to one-half the volume of an aqueous solution of 1 to 2 percent acrylonitrile. The water layer leaving the extraction column is free from acrylonitrile and may be discarded or reused for absorption of subsequently produced crude acrylonitrile. The solvent layer contains generally 2 to 6 percent acrylonitrile and water to the extent of up to about 4 percent of the acrylonitrile present. This solvent layer is passed to the drying still. The water and acrylonitrile form an azeotropic mixture in the column. At a temperature of about 75° C., water-acrylonitrile azeotrope is passed over along with certain impurities. This azeotrope, containing about 12.5 percent water, is passed into a gas stripping still operating under atmospheric pressure where gaseous impurities such as acetaldehyde, hydrocyanic acid, chloroprene, acetylene, and vinyl acetylene are removed. The acrylonitrile-water mixture is withdrawn from the base of the still at about 85° C., cooled to about 15° C., and allowed to layer out in a separator. The upper or acrylonitrile layer contains about 3 percent water and is mixed with subsequently produced solvent layer containing acrylonitrile to be passed back to the drying still. The aqueous layer contains about 7.5 percent acrylonitrile and is returned to the initial dilute aqueous acrylonitrile solution.

The bottoms from the drying still consist of acrylonitrile dissolved in hydrocarbon solvent free from water. This is passed directly into a crude still where acrylonitrile, lactonitrile, any divinyl acetylene present, a small amount of cyanobutadiene, and about 20 percent solvent are distilled over. The still bottoms consist of hydrocarbon solvent, cyanobutadiene, and a small amount of lactonitrile. The cyanobutadiene is removed from the hydrocarbon solvent by reaction with hot 25 percent aqueous sodium bisulfite solution. A bisulfite addition product is formed with cyanobutadiene which is removed by filtration. The solvent is then cooled and is returned to the extraction column. Cyanobutadiene may also be removed from the solvent by means of sulfuric acid. The distillate from the crude still is passed into the purification still where refined dry acrylonitrile is distilled over at about 78° C. The still bottoms consist of some acrylonitrile, solvent, and by-product impurities. These are passed directly to the vacuum recovery still where solvent and acrylonitrile are recovered. This recovered product is returned to the system to be admixed with subsequently-produced solvent layer from the extraction column. The material removed as bottoms from this recovery still consists of by-product impurities and is discarded.

As illustrated by the flow sheet of Figure 2, a dilute aqueous solution of crude acrylonitrile is admixed with an extraction solvent, preferably xylene or ethyl benzene in an extraction column. About 2 to 3 volumes of 1 to 2 percent aqueous solution of crude acrylonitrile can be extracted with a single volume of solvent. The water separated from the extraction column is free from acrylonitrile and may be reutilized for absorption of acrylonitrile or may be discarded. The solvent, containing dissolved acrylonitrile in concentration of 2 to 6 percent and water up to 4 percent of the acrylonitrile present, is passed directly into the crude still. All of the crude acrylonitrile, water, and most of the impurities pass over as distillate, along with some solvent. The bottoms of the still consist of solvent, most of the cyanobutadiene originally present and a small amount of lactonitrile. These bottoms are scrubbed with 25 percent solution of sodium bisulfite or with sulfuric acid for the removal of cyanobutadiene. The solvent, free of cyanobutadiene, is cooled and reutilized in the process.

The distillate passes from the crude still into a gas stripping still where volatile impurities are removed from the acrylonitrile. These include acetaldehyde, hydrocyanic acid, chloroprene, acetylene, and vinyl acetylene. The acrylonitrile, water, solvent, and remaining impurities are drawn off the base of the still and passed into a purification still. Here refined acrylonitrile is distilled over at about 78° C. along with water. The still bottoms consist of some acrylonitrile, solvent and some by-product impurities. These are passed directly into a vacuum recovery still where solvent and the acrylonitrile are recovered. The recovered product is returned to the system to be admixed with subsequently produced acrylonitrile-solvent layer from the extraction column. The material removed as bottoms from the recovery still consists of by-product impurities and is discarded.

In the stills used in these recovery procedures methylene blue is added to the columns, preferably dripped into the still at the head. We find that methylene blue helps prevent polymerization of acrylonitrile during distillation.

In the employment of our improved method of recovery we find a great economic advantage over the use of other methods proposed for the refining of dilute crude acrylonitrile solutions. The favorable extraction of acrylonitrile into xylene or ethyl benzene from water solutions, and the lower specific heats of the organic solvents as compared with water play a large part in this. For example, where a pound of water containing 2 percent acrylonitrile is extracted with one-third volume of xylene for removal of acrylonitrile, the weight of xylene need be only ($\frac{1}{3} \times .875$) or .292 pound. The heat required to heat or cool the pound of water one degree Fahrenheit is one B. t. u. while the approximate amount of heat required to heat or cool the .292 pound of xylene is only $(.292) \times (.41)$ or 0.12 B. t. u. per degree Fahrenheit. Here the specific gravity of the xylene is 0.875 and the specific heat is 0.41. It is evident that this economic feature is quite important in successful commercial operation due to the large amount of heating, in distillations for example, and cooling required in most recovery procedures which have been disclosed.

In the above methods described for treating the dilute aqueous solution, the cyanobutadiene appears to follow the organic solvent when xylene or ethyl benzene are used. A small amount of cyanobutadiene is carried over with the solvent in the crude still in Figures 1 and 2, but the bulk of the cyanobutadiene remains in the liquid phase and is withdrawn with the still bottoms. The still bottoms so removed are treated, periodically or continuously, or a portion of the still bottoms are treated to remove cyanobutadiene and other impurities to prevent build-up of cyanobutadiene in the solvent. The preferred methods for accomplishing this are scrubbing the cyanobutadiene with hot sodium bisulfite solution in water or scrubbing with concentrated sulfuric acid. The bisulfite addition product formed with cyanobutadiene is fairly insoluble in the bisulfite solution and insoluble in the xylene or ethyl benzene solvents. The scrubbed solvent is cooled and filtered to remove any entrained solid materials and returned to be reutilized in the system.

Another convenient method to remove cyanobutadiene is the addition of a dienophile such as maleic anhydride to the hot solution. We have found that such materials appear to react quantitatively with the cyanobutadiene in hot xylene or ethyl benzene solution. Some excess of dienophile is added, and after reaction, the adduct with cyanobutadiene and the excess dienophile are removed from the solution as by scrubbing the solvent with water or sodium hydroxide solution. With this procedure, the solvent is filtered before returning it to the system to be used as further extraction. In some cases where cyanobutadiene is absent from the original crude acrylonitrile, because of the particular manufacturing process used, solvent from the crude still bottoms need only be filtered.

Depending upon what process is employed for manufacture of the crude acrylonitrile, the initial aqueous solution of acrylonitrile may contain some divinyl acetylene, 1-ethynylbutadiene-1,3 or other acetylene polymer. If these are present to any extent in the final product of pure acrylonitrile, they may affect the polymerization properties of the product. To remove these acetylene polymers from final product material when this is necessary, we may treat the acrylonitrile with phosphoric acid at a temperature less than 75° C. The phosphoric acid readily reacts with the acetylene polymers to carry them out of solution as adducts, and reacts only to a small extent, if at all, with the acrylonitrile. For this application we prefer to employ concentrated phosphoric acid solutions in water, for example, 85 percent orthophosphoric acid may be used. More dilute aqueous solutions of phosphoric acid may be employed, but a longer time is required for reaction with the acetylene polymers. After treatment with the phosphoric acid, the acrylonitrile is treated with dilute cold alkaline solution or with ammonia gas or the like, to remove traces of phosphoric acid present in the acrylonitrile.

Another method for removal of acetylene polymers such as divinyl acetylene or 1-ethynylbutadiene-1,3 from dry acrylonitrile is to heat the acrylonitrile to a temperature of about 50° C. to 70° C. in the presence of a dieneophile. Preferably, maleic anhydride is employed. The bulk of the acetylene polymers are separated, apparently as adducts with the dieneophile. Excess dieneophile is used. If a dry product is desired the acrylonitrile may be distilled from the dieneophile and acetylene polymer adducts. The acetylene polymer adducts may also be separated by washing the acrylonitrile with a basic aqueous solution such as a sodium hydroxide solution and finally with water. When basic materials are used such as sodium hydroxide solution care must be exercised to prevent hydrolysis of the acrylonitrile. This type of treatment is usually carried out rapidly at room temperature.

The use of phosphoric acid to react with impurities present in acrylonitrile appears to be more satisfactory than the use of sulfuric acid because of the lower reactivity of phosphoric acid with the acrylonitrile. We have found that dieneophiles such as maleic anhydride do not react with the acrylonitrile at all, but on the other hand do not appear to react completely with the acetylene polymers.

If no acetylene polymers are present in the original aqueous crude acrylonitrile solution these purification steps are not necessary, and we find that the refined acrylonitrile produced by our invention is suitable for polymerization purposes and other uses. The wet acrylonitrile prepared by the method as outlined in Figure 2 can be employed in such processes as emulsion, bead or solution polymerization, where the water has no undesirable effect.

The following are examples of operation of our improved method of refining crude acrylonitrile. In these examples, 1 and 2, any acetaldehyde which was present is calculated as lactonitrile making correction for the hydrocyanic acid involved.

Example 1.—Crude acrylonitrile in aqueous solution, obtained by a reaction of acetylene and HCN in the presence of a Nieuwland-type catalyst and in a weak aqueous solution was treated in a recovery procedure as illustrated by Figure 1. The solution of acrylonitrile continuously obtained from the acrylonitrile absorber of the above mentioned process, had the following composition in pounds per hour: 0.29 acetylene, 0.80 hydrocyanic acid, 1.20 cyanobutadiene, 401 water, 6.24 acrylonitrile, and 1.27 lactonitrile. The water layer from the separator, already described in connection with Figure 1, was continuously added to this aqueous solution. This water layer amounted to about 0.17 pound per hour of water and 0.01 pound per hour of acrylonitrile. The solution was then extracted at 20° C. in an extraction column with 175 pounds per hour of xylene containing about 0.2 pound per hour of lactonitrile as impurity. The water layer, freed of acrylonitrile, was discarded.

The xylene solution from the extraction column was admixed with the organic layer from the separator containing, in pounds per hour, 1.54 acrylonitrile, 0.25 lactonitrile, and .05 water and with the distillate from the vacuum recovery still amounting to on the average 0.31 pound per hour of acrylonitrile, approximately .02 pound per hour of cyanobutadiene and 1.5 to 2 pounds per hour of xylene. The xylene solution, so obtained, consisted of the following in pounds per hour: 176 to 177 xylene, 8.1 acrylonitrile, .29 acetylene, 1.22 cyanobutadiene, 0.23 water, 1.45 lactonitrile and 0.08 hydrocyanic acid. This was passed into the drying still where acrylonitrile and some impurities were distilled over at approximately 75° C., at atmospheric pressure. This distillate was produced at the following average rate in pounds per hour: 1.55 acrylonitrile, 0.23 water, 0.97 lactonitrile, 0.29 acetylene, and 0.08 hydrocyanic acid. This was passed directly into the gas stripping still operating at a head temperature of 35° C. and a base temperature of about 85° C. The gaseous impurities that were stripped off amount to (in pounds per hour) 0.08 hydrocyanic acid, 0.29 acetylene, and 0.72 lactonitrile. The bottoms separated from this stripping still consisted of acrylonitrile, water, and some lactonitrile. These were passed directly into a separator operated at 15° C. The layers separating out were as follows: the water layer of 0.17 pound per hour of water and .01 pound per hour of acrylonitrile, and the organic layer of 1.54 acrylonitrile, 0.25 lactonitrile and .05 water (in pounds per hour). The water layer was passed back to be admixed with initial crude acrylonitrile-water solution and the organic layer was recycled to be admixed with solvent feed, as mentioned above.

The still bottoms from the drying still were passed directly into the crude still at a rate in pounds per hour of 6.55 acrylonitrile, 1.22 cyanobutadiene, 0.48 lactonitrile, and 176 to 177 xylene. The crude still was operated at a head temperature of 78° C. to 82° C. at atmospheric pressure and a base temperature of about 142° C. The distillate in pounds per hour amounted to 6.55 acrylonitrile, 1.5 to 2 xylene, 0.28 lactonitrile, and 0.02 cyanobutadiene. The still bottoms consisted of the remaining xylene and about 1.20 pounds per hour of cyanobutadiene and 0.20 pound per hour of lactonitrile. These were passed into a sodium bisulfite scrubber operating at 90° C. with a recycle rate of 300 pounds per hour of aqueous solution containing about 60 pounds per hour of sodium bisulfite. The sodium bisulfite was utilized at the rate of about 3.2 pounds per hour. Water and sodium bisulfite were added as needed to the column. The xylene solution was then washed with water, filtered and returned to the system at the rate of 175 pounds of xylene per hour, about 0.2 pound per hour of lactonitrile and little or no cyanobutadiene.

The distillate from the crude still passed into the purification still. Pure, dry acrylonitrile was removed at the rate of 6.24 pounds per hour at about 78° C. This material was suitable for polymerization purposes. The still bottoms from the purification still consisted of 1.50 to 2 pounds per hour of xylene, 0.28 pound per hour of lactonitrile and 0.02 pound per hour of cyanobutadiene. These still bottoms were vacuum distilled at about 100 mm. to give an average distillate of 0.31 pound per hour of acrylonitrile, 1.5 to 2 pounds per hour of xylene, and 0.02 pound per hour of the cyanobutadiene. This was returned to be admixed with xylene solution obtained from the extraction column. The residue of the still consisted mostly of lactonitrile. Some unidentified organic products also appeared in this still residue.

Example 2.—Crude acrylonitrile solution in water, as in Example 1, was extracted with xylene solvent at the rate of 175 pounds per hour of xylene containing approximately 0.2 pound per hour of lactonitrile. The extraction was carried out in a column at 20° C. The water layer free from acrylonitrile was discarded. The solvent extract was produced at the following rate in pounds per hour: 175 xylene, 0.29 acetylene, 0.08 hydrocyanic acid, 6.24 acrylonitrile, 1.20 cyanobutadiene, 0.18 water, and 1.20 lactonitrile. This was mixed with 3 pounds per hour of xylene, 0.60 pounds per hour of acrylonitrile, and .04 pound per hour of cyanobutadiene, obtained as distillate from the vacuum recovery still. The solution so produced was passed into the crude still operating at a head temperature of about 78–82° and a base temperature of approximately 142° C. The still bottoms consisted of 175 pounds per hour of xylene containing 1.20 pounds per hour of lactonitrile and 1.20 pounds per hour of cyanobutadiene. These bottoms were treated for removal of cyanobutadiene as in Example 1 and were returned to the system to be used as extraction solvent.

The distillate from the crude still in pounds per hour was produced at the following rate: 3 xylene, 0.29 acetylene, 0.08 hydrocyanic acid, 6.84 acrylonitrile, 0.04 cyanobutadiene, 0.18 water, and 1.0 lactonitrile. This was passed directly into the gas stripping still where the volatile impurities were removed as distillate at 35° C. These consisted of 0.29 acetylene, 0.08 hydrocyanic acid, 0.68 lactonitrile (in pounds per hour). The stripped solution discharged at the base of the drying still at a temperature of about 85° C. This solution had the following composition in pounds per hour: 3 xylene, 6.84 acrylonitrile, .04 cyanobutadiene, 0.18 water, and 0.32 lactonitrile and was passed directly to the purification still-operating at a head temperature of 78° C. Pure acrylonitrile was removed as distillate at the rate of 6.24 pounds per hour. This acrylonitrile was satisfactory for polymerization purposes.

The bottoms from the purification still were discharged to the vacuum recovery still at the following rate in pounds per hour: 3 xylene, 0.60 acrylonitrile, .04 cyanobutadiene, and 0.32 lactonitrile. Substantially, all of the xylene, acrylonitrile, and cyanobutadiene were distilled over, at 100 millimeters of mercury pressure, and returned to the system to be mixed with xylene extract from the extraction column. The residue from the recovery still consisted mainly of lactonitrile and was discarded.

*Example 3.*—Hydrocyanic acid and acetylene were reacted in the presence of a Nieuwland type catalyst at 85° C. to produce acrylonitrile.

The condensed acrylonitrile layer was produced at the following rate in pounds per hour: 6.16 acrylonitrile, 0.18 water, 0.10 vinyl acetylene, .02 divinyl acetylene, 0.1 chloroprene, 0.65 cyanobutadiene, 0.22 lactonitrile, and 0.3 acetaldehyde. Any hydrocyanic acid present was calculated as lactonitrile.

Direct distillation of this product to separate acrylonitrile was unsatisfactory due to deposition of polymeric acrylonitrile in the still. For example, this mixture was distilled in a packed column with a head temperature of about 77° C. and the bulk of the acrylonitrile along with volatile impurities were separated as distillate. After only two days' operation, polymer formation at the base of the still was found. After one week of operation, the still required dismantling and cleaning. The addition of methylene blue to the still did not appreciably affect the rate of polymer formation. This polymerization was attributed to the concentration of cyanobutadiene or like materials, in the still, particularly in the base of the still where the bulk of the heating took place.

The crude acrylonitrile could be processed satisfactorily by our improved method. Using the method as described in connection with Figure 2, no polymer formation in the stills was observed at the end of 12 days of continuous operation in any of the stills. Some still residue in the recovery still could not be identified, but offered no particular difficulty to the operation of the stills. Methylene blue solution in water was added dropwise to the stills, as a stabilizer. The crude acrylonitrile was taken up with 95 pounds per hour of ethyl benzene. Added to this solution was about 3 pounds per hour of ethyl benzene containing 0.6 pound per hour of acrylonitrile and 0.02 pound per hour of cyanobutadiene. The resultant ethyl benzene solution was passed directly into a crude still operating at a head temperature of about 80° C. and a base temperature of about 140° C.

The still bottoms were of the following composition in pounds per hour: 95 ethyl benzene, 0.65 cyanobutadiene, and 0.07 lactonitrile. These were treated with concentrated sulfuric acid at about 20° C., circulated through a scrubber at the rate of about 100 pounds per hour. The ethyl benzene was then washed with cold water, filtered, and was returned to the system to be reutilized. This treatment not only removed the cyanobutadiene but also the lactonitrile. The sulfuric acid in the scrubber was replenished as needed.

The distillate from the crude still was passed directly into a gas stripping still operating at a head temperature of 35° C. and a base temperature of about 85° C. The gaseous impurities removed at the head consisted of the following in pounds per hour: 0.10 vinyl acetylene, 0.1 chloroprene, 0.11 lactonitrile, and 0.3 acetaldehyde. The acrylonitrile solution withdrawn from the still base analyzed as follows in pounds per hour: 6.76 acrylonitrile, 3 ethyl benzene, 0.02 cyanobutadiene, 0.18 water, 0.02 divinyl acetylene, and 0.04 lactonitrile. This was passed directly into the purification still operating at a head temperature of 78° C. Refined acrylonitrile was distilled over at the rate of 6.16 pounds per hour along with .02 pound per hour of divinyl acetylene and 0.18 pound per hour of water. The still bottoms consisted of the following in pounds per hour: 3 ethyl benzene, 0.6 acrylonitrile, .02 cyanobutadiene, and 0.02 lactonitrile. These materials were passed directly into a vacuum recovery still operating at about 100 millimeters of mercury pressure. The recovered ethyl benzene and acrylonitrile along with the cyanobutadiene, which distilled over, was returned to the system to be admixed with more crude acrylonitrile-ethyl benzene solution.

Although the refined acrylonitrile produced could be polymerized, the polymer produced was not readily soluble by usual methods in dimethyl formamide and other solvents. A satisfactory product in this regard was produced by treating the acrylonitrile with 85 percent phosphoric acid as 60° C. for one-half hour, washing the acrylonitrile so treated with cold dilute sodium hydroxide and finally with water.

*Example 4.*—A dry refined acrylonitrile product was obtained in a manner as described in connection with Figure 1 from condensed crude acrylonitrile used as feed material in Example 3. Analysis of this product indicated contamination of the acrylonitrile with about 0.3 percent acetylene polymers. The product as such was not satisfactory for polymerization purposes, because the polymers which could be formed did not possess proper solubility characteristics. This acrylonitrile was treated with maleic anhydride at 70° C. and the acrylonitrile was redistilled. About 1 percent of maleic anhydride by weight of acrylonitrile was added. The distilled product analyzed for less than 0.07 percent acetylene polymers and was satisfactory for polymerization purposes.

In the examples listed, complete material balances could not always be made on spot checks because of the difficulties involved in analyzing the complex solutions. The figures listed for analyses were averages over a period of continuous operation. No differentiation could be made between divinyl acetylene and 1-ethynyl butadiene-1,3 with the analytical procedures employed. Hence, at least some of the material listed as divinyl acetylene in the examples might be 1-ethynyl butadiene-1,3.

In all of the examples the addition of methylene blue to the stills was carried out. In most examples stabilizer was added dropwise as a saturated solution at the top of the distillation column at a rate up to about 1 cc. per minute.

The xylene employed in the examples was from petroleum sources and had the following analysis: 12 percent ethyl benzene, 16 per cent orthoxylene, 55 percent meta-xylene, and 17 percent paraxylene. Any of the xylene isomers could be employed, however.

With regard to operating conditions, the temperature of the extraction column operation does not appear to be critical. Generally this is carried out at a temperature of 15° to 30° C.

Temperatures much above 85° C. bring about decomposition of lactonitrile in the purification still or the recovery still. In the latter case this is not particularly important. The recovery still is generally operated at reduced pressure (less than 150 mm. pressure), however, to prevent decomposition.

When sodium bisulfite is used to remove cyanobutadiene from the recycled hydrocarbon solvent, the concentration of the sodium bisulfite is generally kept at greater than 20 percent and the temperature generally greater than 70° C. to insure fairly rapid and complete reaction. All the cyanobutadiene need not be removed at this point, however, since recycling a small amount of it does not adversely affect the method.

When sulfuric acid is used as to remove cyanobutadiene, the temperature is usually kept at 25° C. or lower to prevent reaction of sulfuric acid with the solvents.

The usual temperature of operation of the separator in the carrying out of the invention as described in connection with Figure 1 is 10° C. to 30° C. Temperatures much higher than these bring about too great a solubility of the water in the acrylonitrile.

Xylene and ethyl benzene have been found to be particularly desirable solvents to use for extraction in our new process because of the extraction coefficient of acrylonitrile from water which is about 3 in favor of these solvents. Other requirements are also satisfied such as the boiling point and stability. Other solvents which have satisfactory extraction coefficients, such as diethyl ether and dibutyl phthalate do not satisfy other requirements. Other hydrocarbons are not suitable for this type of extraction and recovery procedure for various reasons. For example, benzene forms an azeotrope with acrylonitrile and hence is unsuitable. Aliphatic hydrocarbons such as hexane, for example, possess unsatisfactory extraction coefficients.

The present invention constitutes a substantial advance in the purification of acrylonitrile in permitting continuous operation. The elimination of polymer formation which constitutes an outstanding feature of the invention is thought to be due to the reduction of the cyanobutadiene concentration in the presence of the acrylonitrile. Where xylene or ethyl benzene is used the cyanobutadiene does not come into close contact with the acrylonitrile in any substantial concentration during distillation because of the cyanobutadiene remains with the solvent. This is not the case when an aqueous solution of crude acrylonitrile is distilled, as has already been explained. The reason that such impurities as cyanobutadiene bring about polymerization of acrylonitrile is not known.

Reduction in the amount of undesired polymerization may also be due, in part, to the fact that very low molecular weight polymers of acrylonitrile appear to be soluble in hot xylene or ethyl benzene, and do not at once deposit on the walls of the distillation vessel. When an aqueous solution is used, however, any polyacrylonitrile formed may precipitate on the walls of the vessel, thus forming a locus for further polymerization of acrylonitrile.

The invention may also be employed to refine acrylonitrile obtained by any other processes which produce similar impurities to those produced by the reaction of hydrocyanic acid and acetylene in the presence of a Nieuwland type catalyst.

The production of a refined product of acrylonitrile which is suitable for polymerization purposes and the elimination of the difficulties of polymer formation during the production of such a refined product are the main advantages of this invention. The economy of operation of this invention as compared with other procedures which have been disclosed is self-evident.

We claim:

1. A continuous method of refining aqueous solutions of crude acrylonitrile containing impurities including cyanobutadiene which comprises continuously extracting the acrylonitrile from the solution by means of a hydrocarbon solvent selected from the group consisting of ethyl benzene and xylene, distilling the water as acrylonitrile azeotrope from the solvent extract along with some impurities, removing the volatile impurities from the distillate so produced by distillation, separating the water-acrylonitrile azeotropic mixture after removal of volatile impurities, into two layers at 10° C. to 30° C., returning the lower layer which is predominantly water containing some acrylonitrile to the system to be admixed with aqueous solution of crude acrylonitrile, and returning the upper layer which is predominantly acrylonitrile containing some water to the system to be admixed with subsequently produced solvent extract containing water and acrylonitrile; passing the solvent extract after removal of water to a still and removing the acrylonitrile therefrom as distillate along with some solvent and some impurities, removing at least a part of any cyanobutadiene present from the solvent which has been freed of acrylonitrile and returning the solvent to the system for further use in extraction; passing the acrylonitrile distillate containing some solvent and impurities to a still and removing refined dry acrylonitrile from the solvent and impurities as distillate at 78° C., passing the still bottoms to a vacuum still operating at less than 150 millimeters of mercury pressure, removing the solvent and any acrylonitrile present as distillate, and returning these to the system to be admixed with subsequently produced solvent extract containing crude acrylonitrile.

2. A method according to claim 1 wherein the removing of cyanobutadiene from the solvent is accomplished by contacting the solvent with a substance of relatively low reactivity with acrylonitrile but capable of reacting with cyanobutadiene to form an adduct of low solubility in the solvent, said substance being selected from the group consisting of sodium bisulfite, sulfuric acid and dienophiles such as maleic anhydride.

3. A continuous method of refining aqueous solutions containing substantially only crude acrylonitrile organic impurities, and unreacted HCN and acetylene, which comprises continuously extracting the acrylonitrile from the solution by means of a hydrocarbon solvent selected from the group consisting of xylene and ethyl benzene, distilling the solvent extract at around 80° head temperature and removing as distillate acrylonitrile solution containing water, some solvent, and some impurities, removing at least a portion of any cyanobutadiene present in the still bottoms which consist of hydrocarbon solvent containing some impurities and returning the solvent to the system for further use in extraction; removing the volatile impurities from the distillate which contains acrylonitrile by a gas stripping distillation and subjecting the acrylonitrile solution after such treatment to a purification distillation wherein refined acrylonitrile product containing some water is separated as distillate at 75° C. to 78° C. from the solvent and impurities, subjecting the still bottoms to a vacuum distillation at less than 150 millimeters of mercury pressure, wherein the solvent and any acrylonitrile present are removed as distillate, and returning these to the system to be admixed with subsequently produced solvent extract containing crude acrylonitrile.

4. In the refining of aqueous solutions prepared by dissolving in water acrylonitrile leaving the reactor in which it is prepared from acetylene and HCN, and containing impurities including cyanobutadiene, the steps comprising extracting the acrylonitrile from the solution by a hydrocarbon solvent selected from the group consisting of xylene and ethyl benzene, and separating a substantial portion of the acrylonitrile from the solvent by distillation at 78–82° C. head temperature to remove acrylonitrile overhead while a substantial portion of the cyanobutadiene and solvent remain as still bottoms, whereby further distillation purification of the thus separated acrylonitrile is carried out in the substantial absence of cyanobutadiene, thus avoiding the polymerization effects which are promoted by presence of cyanobutadiene during such distillation purification.

5. The method of removing acetylene polymer impurities from acrylonitrile which comprises treating the acrylonitrile containing such impurities with maleic anhydried, and recovering the acrylonitrile therefrom by distillation.

6. A method of refining aqueous solutions of crude acrylonitrile containing impurities including cyanobutadiene, which comprises extracting the acrylonitrile from the solution by a suitable solvent for the acrylonitrile and impurities, distilling off from the solvent and dissolved substances a water-acrylonitrile azeotrope to render the solvent and remaining acrylonitrile substantially water free, distilling a substantial portion of the acrylonitrile with impurities and a small amount of solvent from the water free solvent, and again refining the acrylonitrile by distillation.

7. A method according to claim 6 wherein said azeotrope is distilled off at about 75° C., the following distillation being carried out at about 78°–82° C. head temperature, and the final refining distillation being carried out at about 78° C.

8. A method according to claim 6, and the steps of subjecting the water-acrylonitrile azeotrope to a gas stripping treatment to remove gaseous impurities following which the acrylonitrile-water mixture is permitted to separate into a first layer containing a major portion of acrylonitrile and a second layer containing a minor portion of acrylonitrile, adding the first layer to the solvent layer from the solvent extraction step, and adding the second layer to fresh solution to be subjected to the solvent extraction step.

9. A method of removing cyanobutadiene from solution in a solvent selected from the group consisting of xylene and ethyl benzene, comprising contacting the solution with a substance capable of reacting with the cyanobutadiene to form an adduct of low solubility in the solvent, said substance being selected from the group consisting of sodium bisulfite, sulfuric acid and dieneophiles such as maleic anhydride.

10. A method of removing cyanobutadiene from solution in a solvent selected from the group consisting of xylene and ethyl benzene, comprising treating the solution with a sodium bisulfite solution at a temperature above 70° C., while maintaining the sodium bisulfite concentration greater than 20%.

11. A method of removing cyanobutadiene from solution in a solvent selected from the group consisting of xylene and ethyl benzene, comprising treating the solution with sulfuric acid at a temperature not exceeding about 25° C.

12. A method of removing cyanobutadiene from solution in a solvent selected from the group consisting of xylene and ethyl benzene, comprising treating the solution with maleic anhydride.

References Cited in the file of this patent

UNITED STATES PATENTS

| | | |
|---|---|---|
| 2,242,309 | Lazier et al. | May 20, 1941 |
| 2,324,854 | Kurtz et al. | July 20, 1943 |
| 2,352,606 | Alder et al. | July 4, 1944 |
| 2,361,367 | Davis et al. | Oct. 31, 1944 |
| 2,401,772 | Ralston et al. | June 11, 1946 |
| 2,404,163 | Carpenter et al. | July 16, 1946 |
| 2,409,124 | Heuser | Oct. 8, 1946 |
| 2,417,635 | Davis | Mar. 18, 1947 |
| 2,526,676 | Lovett | Oct. 24, 1950 |
| 2,548,369 | Harwood | Apr. 10, 1951 |
| 2,555,798 | Kropa | June 5, 1951 |
| 2,579,638 | Zwilling et al. | Dec. 25, 1951 |
| 2,621,204 | MacLean et al. | Dec. 9, 1952 |

FOREIGN PATENTS

| | | |
|---|---|---|
| 263,275 | Switzerland | Dec. 1, 1941 |